United States Patent
Kleindessner et al.

(10) Patent No.: US 12,229,179 B1
(45) Date of Patent: Feb. 18, 2025

(54) MITIGATING BIAS IN MULTIMODAL MODELS VIA QUERY TRANSFORMATION

(71) Applicant: Amazon Technologies, Inc., Seattle, WA (US)

(72) Inventors: Matthaeus Kleindessner, Tuebingen (DE); Christopher Michael Russell, Tuebingen (DE); Kailash Budhathoki, Tuebingen (DE); Ali Caner Turkmen, Berlin (DE); Siqi Deng, Bellevue, WA (US); Varad Gunjal, Brooklyn, NY (US); Ashwin Swaminathan, Dublin, CA (US); Raghavan Manmatha, San Francisco, CA (US); Hao Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/515,105

(22) Filed: Nov. 20, 2023

(51) Int. Cl.
*G06F 16/40* (2019.01)
*G06F 16/432* (2019.01)
*G06F 16/53* (2019.01)

(52) U.S. Cl.
CPC ............ *G06F 16/432* (2019.01); *G06F 16/53* (2019.01)

(58) Field of Classification Search
CPC .............................. G06F 16/432; G06F 16/53
See application file for complete search history.

(56) References Cited

U.S. PATENT DOCUMENTS

| | | | |
|---|---|---|---|
| 10,242,260 B1 * | 3/2019 | Shen | G06F 40/205 |
| 10,467,339 B1 * | 11/2019 | Shen | G06F 40/247 |
| 2021/0240892 A1 * | 8/2021 | Meinders | G06F 30/27 |
| 2022/0012297 A1 * | 1/2022 | Basu | G06N 3/045 |
| 2023/0274179 A1 * | 8/2023 | Tsang | G06N 20/00 |
| | | | 706/12 |

OTHER PUBLICATIONS

Article entitled "Are Gender-Neutral Queries Really Gender-Neutral? Mitigating Gender Bias in Image Search", by Wang et al., dated Sep. 12, 2021 (Year: 2021).*

* cited by examiner

*Primary Examiner* — Mahesh H Dwivedi
(74) *Attorney, Agent, or Firm* — Knobbe, Martens, Olson & Bear, LLP

(57) ABSTRACT

The present disclosure generally relates to systems and methods for searching media content. In some implementation examples, a search system receives an input query, generates a query embedding of the input query, and generates a bias mitigation transformation associated with a sensitive attribute. Based on the query embedding and the bias mitigation transformation, the search system generates a transformed query embedding that suppresses at least a portion of the query embedding related to the sensitive attribute. Using the transformed query embedding, the search system executes a similarity search in a media embedding model to identify one or more media embeddings that are similar to the transformed query embedding and transmits the one or more media embeddings.

20 Claims, 7 Drawing Sheets

MITIGATING BIAS IN MULTIMODAL MODELS VIA QUERY TRANSFORMATION

BACKGROUND

Multimodal (MM) embedding models provide joint embedding spaces for data from multiple media sources (e.g., text, images, audio, or video). MM embedding models can be utilized for providing various applications or services. For example, MM embedding models may allow users to query images that match textual descriptions in user queries.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
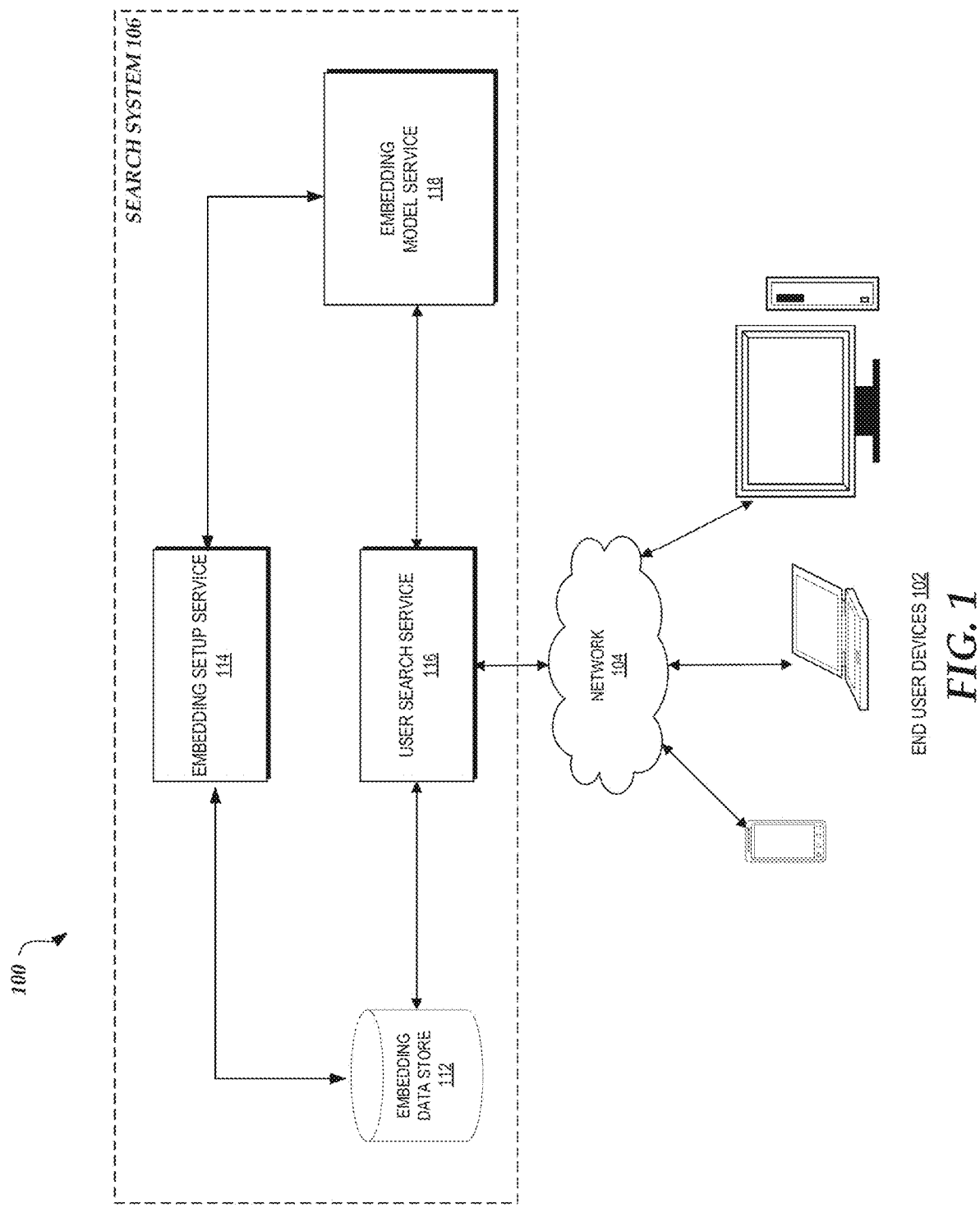
FIG. 1 depicts an example computing environment in which embodiments of the present disclosure can be implemented by a search system to mitigate bias in multimodal (MM) models via query transformation, according to some embodiments of the present disclosure.

The present disclosure relates to mitigating bias in embeddings generated by multimodal (MM) embedding models. More specifically, some embodiments of the present disclosure relate to a network-based or online search system that obfuscates or suppress demographic information in embeddings generated by MM embedding models via orthogonal projections in embedding spaces to return search results that are unbiased or less susceptible to bias.

Multimodal (MM) embedding models provide joint embedding spaces for data from various sources, such as text, images, audio, video, or other media sources. For example, some MM embedding foundation models (FMs) provide a joint embedding space for image and text data. In the joint embedding space, an embedding of an image may be mathematically close to an embedding of a text (e.g., a text included in a user query) embedding if the image and the text are related (e.g., the text being a verbal description of the image). Thus, MM embedding models can be utilized for providing various applications or services, such as allowing users to query images, audios, or videos that match textual descriptions in user queries.

However, MM embedding models are known to pick up biases and stereotypes present in data (e.g., data collected from the Internet) that are used to train the MM embedding models. More specifically, embeddings generated by a MM embedding model may inherit at least some biases from training data sets utilized to train the MM embedding model. As such, for example, some MM embedding models pre-dominantly return images of men in response to receiving a user or input query that searches for "a photo of a genius."

To mitigate bias associated with MM embedding models, a projection matrix can be generated to project out biases within embeddings obtained from a MM embedding model. In some examples, a projection matrix can be generated by fitting to a dataset of a modality, where datapoints in the dataset are annotated with demographic information (e.g., race, gender, age, skin tone, or the like). For example, the data set may include diverse facial images with demographic annotations, and a projection matrix can be generated by fitting to the dataset based on facial images annotated with demographic information. By applying the projection matrix to embeddings of datapoints (e.g., embeddings of images or image embeddings) in the dataset, bias in embeddings can be mitigated.

Yet, straightforward application of a projection matrix to embeddings may lead to several technical disadvantages or challenges, particularly when under large-scale production settings (e.g., when a number or a size of embeddings is large). For example, to mitigate bias in media (e.g., images, audio, video, or the like) embeddings and a query embedding for searching media based on an input query, a projection matrix may have to be respectively applied to a media embedding and the query embedding before computing an inner product to measure a similarity between the media embedding and the query embedding.

More specifically, given an input query Q and an image $I_i$ (where i is from 1 to n, n representing a number of images in a set of images), a MM embedding model may return a query embedding $E(Q)$ and an image embedding $E(I_i)$. To mitigate bias in the query embedding $E(Q)$ and the image embedding $E(I_i)$ for searching an image $I_i$ that is most or more similar to the input query Q, a projection matrix approach for generating a similarity score $SS_i$ between the query embedding $E(Q)$ and the image embedding $E(I_i)$ can be implemented via use of equation (1), where P is a projection matrix, $PE(Q)$ represents multiplying the query embedding $E(Q)$ by the projection matrix P. $PE(I_i)$ represents multiplying the image embedding $E(I_i)$ by the projection matrix P, and $<PE(Q),PE(I_i)>$ represents an inner product between $PE(Q)$ and $PE(I_i)$. The image embedding $E(I_i)$ that results in the highest similarity score $SS_i$ can be identified as the image embedding that is most similar to the query embedding $E(Q)$. As such, straightforward application of the projection matrix approach may require a matrix multiplication on an individual image embedding $E(I_i)$ of a set of image embeddings. As n grows large, the amount of computation increases proportionally, making the projection matrix approach less scalable.

$$SS_i = <PE(Q), PE(I_i)> \quad (1)$$

Second, matrix multiplications on individual image embedding using a projection matrix may have to be performed in advance rather than performed on the fly (e.g., in response to receiving an input query) in view of an amount of computation on a large set of image embeddings. Yet, whether there is a need to mitigate bias may not be known until an input query is received. For example, bias mitigation on gender may be necessary if the input query provides "a photo of a genius" but may be unnecessary if the input query provides "a photo of a woman with red hair." As such, some of the computation performed in advance may not be or seldom utilized for responding to user queries and may make a search system less efficient.

Third, in order to obfuscate or suppress various demographic attributes (e.g., gender, age, race, skin tone, hair color, or the like) or combinations of various demographic attributes (e.g., gender and race, gender and hair color) in image embeddings, various versions of projection matrixes will be needed to compute and store various versions of inner products between projection matrixes and image embeddings. For example, for mitigating bias against gender, a search system may have to compute matrix multiplications on an image embedding using a projection matrix $P_g$ that is modified from a projection matrix P based on gender to generate a transformed image embedding $P_g E(I_i)$. For mitigating bias against age, the search system may have to compute matrix multiplications on the image embedding $E(I_i)$ using another projection matrix Pa that is modified from the projection matrix P based on age to generate a transformed image embedding $P_a E(I_i)$. For mitigating bias against both race and gender, the search system may have to compute matrix multiplications on the image embedding $E(I_i)$ using yet another projection matrix $P_{rg}$ that is modified from the projection matrix P based on race and gender to generate a transformed image embeddings $P_{rg} E(I_i)$. As such, computation and storage resources utilized by the search system to mitigate bias associated with embeddings of MM embedding models may further increase.

Some aspects of the present disclosure address some or all of the issues or technical challenges noted above, among others, by implementing a search system (or simply a "system") that obfuscates or suppress demographic information in embeddings generated by MM embedding models via orthogonal projections on embeddings of input queries to return search results that may be unbiased regarding one or more demographic attributes. Additionally and/or optionally, based on an intent expressed by the input query, the system may return search results that may be biased regarding some demographic attribute(s) based on the intent.

In some embodiments, to obfuscate or suppress some demographic attribute(s) in embeddings for returning unbiased or less biased search results, some disclosed techniques generate a bias mitigation transformation based on a projection matrix and apply the bias mitigation transformation to a query embedding to generate a transformed query embedding for executing a similarity search with media embeddings (e.g., text embeddings, image embeddings, video embeddings, audio embeddings, or any combination of multimedia embeddings) rather than applying the projection matrix to both the query embedding and individual media embeddings. For example, instead of implementing equation (1) above, some disclosed techniques may implement equation (2) for generating a similarity score $SS_i$ using a bias mitigation transformation $P^T P$, where P is a projection matrix, $P^T PE(Q)$ is a transformed query embedding that may represent multiplying a transposition of the projection matrix P by the projection matrix P and the query embedding $E(Q)$, $E(I_i)$ represents an image embedding, and $<P^T PE(Q), E(I_i)>$ represents an inner product between $P^T PE(Q)$ and the image embedding $E(I_i)$.

$$SS_i = <P^T PE(Q), E(I_i)> \quad (2)$$

By executing a similarity search using the equation (2), the disclosed techniques for mitigating biases in embeddings obtained from a MM embedding model can be more computationally efficient because no matrix multiplications on media embeddings are required. Rather, matrix multiplication can be performed solely on a query embedding $E(Q)$ and none of image media embeddings needs to be multiplied with a projection matrix or a bias mitigation transformation. Advantageously, the disclosed search system can handle large datasets and become more scalable.

Additionally, decisions on whether to mitigate biases and associated computations (e.g., matrix multiplications on query embeddings) can be postponed or delayed until "inference time" (e.g., when an input query is received and an intent expressed in the input query can be determined) because of reduced computational complexity associated with performing matrix multiplications on query embeddings. As such, decisions on whether to mitigate biases and/or performing matrix multiplications on query embeddings can be made on the fly (e.g., in response to receiving an input query) and less computational resources may be wasted.

Further, the search system does not need to compute and store various versions of inner products between projection matrixes and image embeddings because matrix multiplications on media embeddings are unnecessary. To mitigate bias against various demographic attributes or various combinations of demographic attributes, the system may simply modify a projection matrix that was fit to a dataset based on attribute(s) that are selected for bias mitigation to generate the bias mitigation transformation. Advantageously, the adaptability and the scalability of the search system may be improved. The search system may also require less data storage capacity.

In some embodiments, the search system may receive an input query from a user. The user may intend to search one or more media (e.g., images, audio, video, or the like) using the input query. Optionally, the system may determine that the input query expresses an intent to perform an image search and that at least one criterion of the image search includes a first sensitive attribute (e.g., race, gender, age, skin tone, or another attribute by which a person can be potentially discriminated against). The system may then generate a query embedding of the input query using an MM embedding model and generate a bias mitigation transformation associated with a second sensitive attribute that is different from the first sensitive attribute. Based on the query embedding and the bias mitigation transformation, the system may generate a transformed query embedding that is to suppress, when executing a similarity search, at least a portion of the query embedding related to the second sensitive attribute without suppressing any portion of the query embedding related to the first sensitive attribute. Using the transformed query embedding, the system may execute the similarity search in a media embedding model to identify one or more image embeddings that are similar to the transformed query embedding, where the one or more image embeddings are generated by the MM embedding model. The system may then transmit the one or more image embeddings.

For example, an input query from the user may include "a female doctor." The system may determine that the input query intends to perform an image search that includes a criterion on gender (e.g., the gender being female) such that bias against gender may not be mitigated by the system during the image search. The system may nevertheless determine to mitigate bias against race during the image search and generate a bias mitigation transformation associated with race. Based on a query embedding of the input query and the bias mitigation transformation, the system may generate a transformed query embedding that is to suppress a portion of a query embedding related to race without suppressing any portion of the query embedding related to gender. As such, one or more image embeddings identified by the system during a similarity search using the transformed query embedding may be biased against gender (e.g., searching for images of female) but unbiased or less biased against race (e.g., searching for female doctors across diverse races).

To efficiently mitigate bias in media searches, some disclosed techniques disclose a method for obfuscating or suppressing demographic information in embeddings generated by MM embedding models via orthogonal projections on embeddings of input queries. In some embodiments, a disclosed method may include receiving an input query, generating a query embedding of the input query, and generating a bias mitigation transformation associated with a first sensitive attribute. The first sensitive attribute may be a demographic attribute, such as gender, age, race, skin tone, or the like. Based on the query embedding and the bias mitigation transformation, a transformed query embedding that suppresses at least a portion of the query embedding related to the first sensitive attribute during a similarity search may be generated. The method then executes, using the transformed query embedding, the similarity search in a media embedding model to identify one or more media embeddings that are similar to the transformed query embedding; and transmits the one or more media embeddings.

In various implementations, the first sensitive attribute may be determined based on the input query. For example, the first sensitive attribute may be determined based on an intent expressed in the input query. More specifically, the input query may explicitly instruct the system to mitigate bias against race when executing a similarity search and the first sensitive attribute may be determined as race. Alternatively, the first sensitive attribute may be determined based on a classification model, where the classification model may be any machine learning models trained to infer or classify intent of the input query.

Additionally and/or optionally, the bias mitigation transformation may be associated with two or more sensitive attributes. For example, the bias mitigation transformation may be associated with both age and skin tone. A transformed query embedding generated by using the bias mitigation transformation may suppress at least a portion of the query embedding related to age and at least a portion of the query embedding related to skin tone during a similarity search. In various implementations, a bias mitigation transformation may be generated by modifying a projection matrix based on one or more sensitive attributes that are to be mitigated during a similarity search, where the projection matrix may be generated in advance by fitting to a dataset.

As used herein, "input query" or "user query" should be understood to include a request to search for media comprising images, video, audio, a multimedia document, a presentation or part of a presentation, code, content, or other media. A query may be generated by a system implementing a model, may be received from a user, and/or retrieved from a data store storing previously generated or received queries.

As used herein, an "embedding" can refer to a low dimensional vector representation of data, such as, but not limited to, words. An embedding can capture some of the semantics of the input by placing semantically similar inputs closer together in the embedding space. An embedding can be learned and/or reused across models.

The term "model," as used in the present disclosure, can include any computer-based models of any type and of any level of complexity, such as any type of sequential, functional, or concurrent model. Models can further include various types of computational models, such as, for example, multimodal (MM) models (e.g., models or combinations of models that can accept inputs of multiple modalities, such as images and text), artificial neural networks ("NN"), language models (e.g., large language models ("LLMs")), artificial intelligence ("AI") models, machine learning ("ML") models, and/or the like.

A Data Store is any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality.

While certain aspects and implementations are discussed herein with reference to use of a multimodal (MM) model, and/or AI, those aspects and implementations may be performed by any other language model, LLM, AI model, generative AI model, generative model, ML model, NN, and/or other algorithmic processes. Similarly, while certain aspects and implementations are discussed herein with reference to use of a classification model, those aspects and implementations may be performed by any other AI model, generative AI model, generative model, NN, ML model, and/or other algorithmic processes.

In various implementations, the multimodal (MM) models and/or other models (including ML models) of the present disclosure may be locally hosted, cloud managed, accessed via one or more Application Programming Interfaces ("APIs"), and/or any combination of the foregoing and/or the like. Additionally, in various implementations, the MM models and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried via the MM models or MM embedding models using the systems and methods of the present disclosure may include any type of electronic data, such as text, files, documents, books, manuals, emails, images, audio, video, databases, metadata, positional data (e.g., geo-coordinates), geospatial data, sensor data, three-dimensional (3D) data, web pages, time series data, and/or any combination of the foregoing and/or the like. In various implementations, such data may comprise model inputs and/or outputs, model training data, modeled data, and/or the like.

Examples of MM models, MM embedding models, language models, and/or LLMs that may be used in various implementations of the present disclosure include, for example, Contrastive Learning In Pretraining (CLIP), Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

As will be appreciated by one of skill in the art in light of the present disclosure, the embodiments disclosed herein improve the ability of computing systems to generate less biased search results through obfuscating or suppressing demographic information in embeddings generated by MM embedding models via orthogonal projections on embeddings of input or user queries. Furthermore, the techniques described in the present disclosure enable computing devices to decide whether to mitigate biases and/or perform matrix multiplications on query embeddings on the fly (e.g., in response to receiving an input query). The utility of the present disclosure is further demonstrated by conserving computational and storage resources of computing systems through transforming embeddings of input queries rather than transforming various versions of media embeddings for executing similarity search. Thus, the present disclosure represents an improvement in computing platforms for mitigating in performing searches.

Various aspects of the disclosure will be described with regard to certain examples and embodiments, which are intended to illustrate but not limit the disclosure. Although aspects of some embodiments described in the disclosure will focus, for the purpose of illustration, on particular examples of content types, machine learning models, and the like, the examples are illustrative only and are not intended to be limiting. In some embodiments, the techniques described herein may be applied to additional or alternative types of content types, machine learning models, and the like. Additionally, any feature used in any embodiment described herein may be used in any combination with any other feature or in any other embodiment, without limitation.

Example Search Systems

FIG. 1 depicts an example computing environment 100 in which embodiments of the present disclosure can be implemented by a search system 106 to return search results that are unbiased or less biased against one or more sensitive attributes to end user devices 102. The computing environment 100 may include the search system 106, a network 104, and the end user devices 102. The search system 106 can be accessed by the end user devices 102 through the network 104. In some embodiments, the search system 106 can be implemented by one or more computing devices (e.g., desktop, laptop and the like) for conducting network-based or online activities, such as facilitating network-based or online media or content searches.

In some embodiments, the search system 106 may be a part of a cloud provider network (e.g., a "cloud"), which may correspond to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to provide various services, such as collecting sample data associated with network-based or online experiments and performing statistical analysis techniques as disclosed in the present disclosure. The computing services provided by the cloud that may include the search system 106 can thus be considered as both the applications delivered as services over a publicly accessible network (e.g., the Internet, a cellular communication network) and the hardware and software in cloud provider data centers that provide those services.

Additionally, end user devices 102 may communicate with the search system 106 via various interfaces such as application programming interfaces (API) as a part of cloud-based services. In some embodiment, the search system 106 may interact with the end user devices 102 through one or more user interfaces, command-line interfaces (CLI), application programing interfaces (API), and/or other programmatic interfaces for requesting actions, requesting services, initiating network-based or online media searches, and/or the like. For example, the search system 106 may transmit through the network 104 search results that include images, videos, audios, or the like (e.g., generated by some of the techniques described in the present disclosure) to the end user devices 102 in response to receiving input queries from the end user devices 102.

Various example end user devices 102 are shown in FIG. 1, including a desktop computer, laptop, and a mobile phone, each provided by way of illustration. In general, the end user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the end user devices 102 may transmit input queries (e.g., searching for images of a man with black skin) to the search system 106 and get search results from the search system 106 through the network 104.

In some embodiments, the network 104 includes any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, the search system 106 includes the user search service 116, the embedding data store 112, the embedding setup service 114, and the embedding model service 118. The search system 106 may be a logical association of one or more computing devices for receiving, processing, and responding to queries from the end user devices 102 and. The search system 106 (or individual components thereof, such as the embedding data store 112, embedding setup service 114, the user search service 116, and the embedding model service 118) may be implemented on one or more physical server computing devices. In some embodiments, the search system 106 (or individual components thereof) may be implemented on one or more host devices, such as blade servers, midrange computing devices, mainframe computers, desktop computers, or any other computing device configured to provide computing services and resources.

The embedding model service 118 may include at least a multimodal (MM) embedding model (not shown in FIG. 1), such as a MM embedding foundation model (FM) that provides joint embedding spaces for various types of media. The MM embedding model may accept inputs of multiple modalities and return embeddings of the multiple modalities. The embeddings provided by the MM embedding model may be stored in a data store (not shown in FIG. 1) that is associated with the embedding model service 118. As noted above, the MM embedding model provisioned by the embedding model service 118 may pick up biases and stereotypes from training data that were used to train the MM embedding model. Additionally, the embedding model service 118 may further include a query intent classifier (not shown in FIG. 1) that can be implemented as a classification model, where the classification model may be any machine learning models trained to infer or classify intent of input queries received from the end user devices. The embedding model service 118 may utilize the query intent classifier and the MM embedding model to generate bias mitigation transformations for applying to query embeddings to generate transformed query embeddings that, when used during similarity searches, may mitigate biases against one or more sensitive attributes.

The embedding data store 112 may store media (e.g., text, image, video, audio, or other media) embeddings that are obtained from a multimodal (MM) embedding model, where the MM embedding model may be stored in the embedding model service 118 that will be described below. Optionally, the embedding data store 112 may further store a media embedding model (not shown in FIG. 1) that can be utilized by the search system 106 to execute similarity searches for identifying media embeddings (e.g., text embeddings, image embeddings, video embeddings, audio embeddings, or the like) that are similar to transformed query embeddings.

In some embodiments, the embedding data store 112 may be any computer-readable storage medium and/or device (or collection of data storage mediums and/or devices). Examples of the embedding data store 112 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. For example, the embedding data store 112 and the search system 106 may be parts of a hosted storage environment that includes a collection of physical data storage devices that may be remotely accessible and may be rapidly provisioned as needed (commonly referred to as "cloud" storage).

In some embodiments, the embedding setup service 114 may set up data stored in the embedding data store 112 by accessing the embedding model service 118. More specifically, the embedding setup service 114 may request and obtain media embeddings from the embedding model service 118 and store the media embeddings into the embedding data store 112 before the search system 106 receives an input query from the end user devices 102.

The user search service 116 may interact with the end user devices 102 to allow the end user devices 102 to search media that are most or more similar to user queries. The user search service 116 is a component of the 106 configured to manage interactions between the end user devices 102 and the search system 106. The user search service 116 can include a query interface that receives input queries from the end user devices 102 and may convert the input queries into formats accepted by machine learning model(s) of the embedding model service 118 (e.g., a query intent classifier or a MM embedding model). The query interface may allow the end user devices 102 to search for various types of media embeddings or may be tailored for a specific type of media, such as an image query interface.

Additionally, the user search service 116 may be configured to generate user interface data that may be rendered on the end user devices 102, such as to receive an initial input query, as well as later input query that may be used to initiate further media searching. In various implementations, the functionality discussed with reference to the user search service 116, and/or any other user interface functionality discussed herein, may be performed by a device or service outside of the search system 106 and/or the user search service 116 may be outside the search system 106. The end user devices 102 may provide an input query to the user search service 116 indicating a natural language query for some media searching and/or data analysis to be performed.

In some embodiments, the user search service 116 may receive an input query from the end user devices 102. The embedding model service 118 may determine that the input query expresses an intent to perform an image search and that at least one criterion of the image search includes a first sensitive attribute (e.g., race, gender, age, skin tone, or the like). The embedding model service 118 may then generate a query embedding of the input query using an MM embedding model and generate a bias mitigation transformation associated with a second sensitive attribute that is different from the first sensitive attribute. Based on the query embedding and the bias mitigation transformation, the embedding model service 118 may generate a transformed query embedding that is to suppress, when executing a similarity search, at least a portion of the query embedding related to the second sensitive attribute without suppressing any portion of the query embedding related to the first sensitive attribute. Using the transformed query embedding, the user search service 116 may utilize the embedding data store 112 to execute the similarity search in an image embedding model to identify one or more image embeddings that are similar to the transformed query embedding. The embedding data store 112 may transmit the one or more image embeddings to the user search service 116. The user search service 116 may return one or more images that correspond to the one or more image embeddings to the end user devices 102.

Example System Functionality and Interactions of Related Aspects

Figure 2:
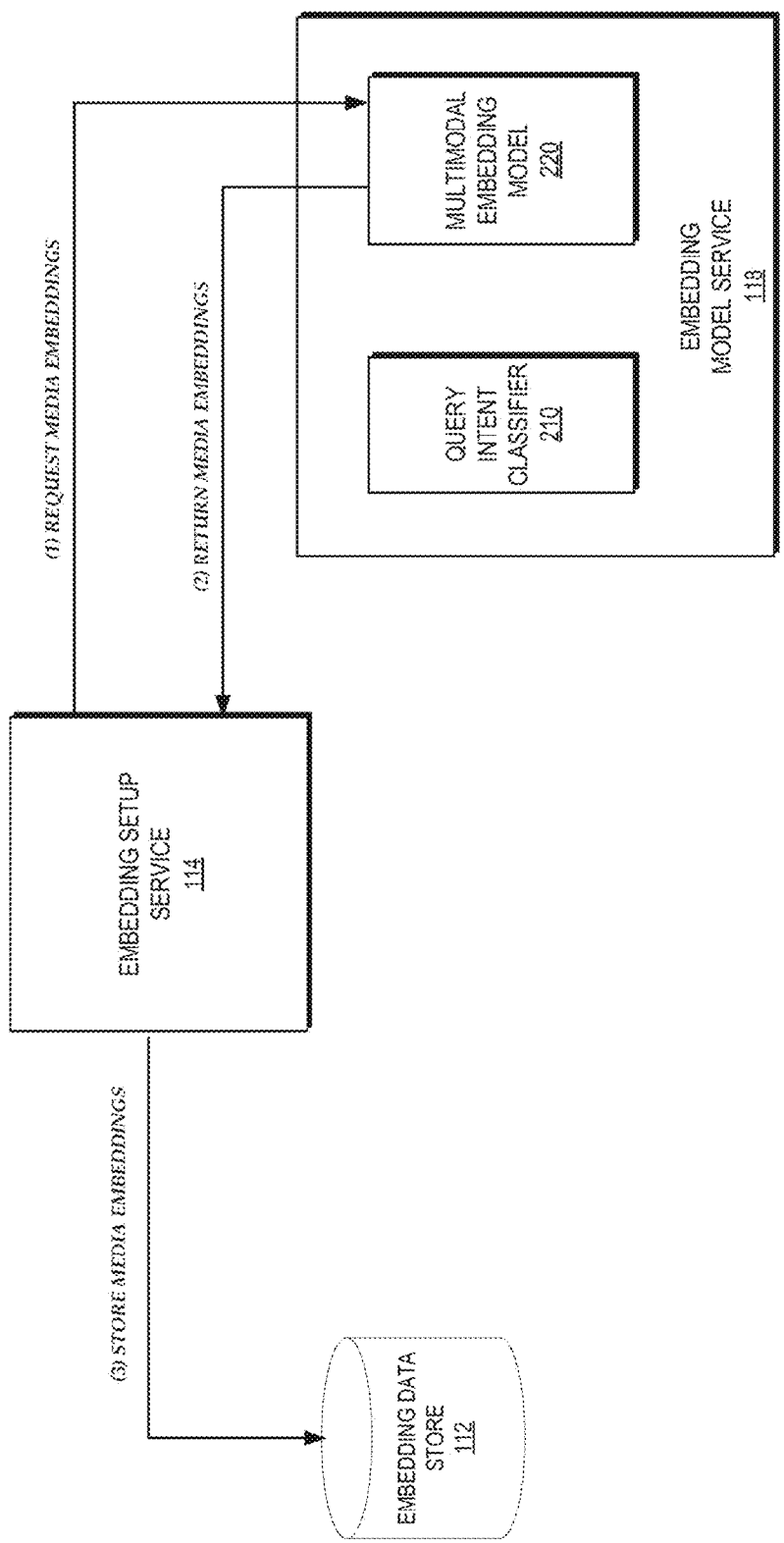
FIG. 2 depicts example interactions between elements of the search system of FIG. 1 to store media embeddings for media searching, according to some embodiments of the present disclosure.

With reference to FIG. 2, illustrative interactions will be described depicting how elements (e.g., the embedding data store 112, the embedding setup service 114, the embedding model service 118 that includes a query intent classifier 210 and a MM embedding model 220) of the search system 106 of FIG. 1 can coordinate to store media embeddings that will be utilized for searching media based on user queries.

The interactions of FIG. 2 begin at (1), where the embedding setup service 114 requests media embeddings from the MM embedding model 220. The media embeddings may include embeddings of images, embeddings of audios, embeddings of videos, or embeddings of other types of media. For example, the embedding setup service 114 may request image embeddings from the MM embedding model 220. The embedding setup service 114 may request media embeddings from the MM embedding model 220 in response to an initiation by an administrator of the embedding setup service 114 or the search system 106. Alternatively, the embedding setup service 114 may request embedding from the MM embedding model 220 periodically or responsive to a triggering event.

At (2), the MM embedding model 220 may return media embeddings requested by the embedding setup service 114. The media embeddings may represent low dimensional vector representations of any types of media, such as, but not limited to, images, audios, videos, texts, or the like. As noted above, the media embeddings returned by the MM embedding model 220 may be biased because the MM embedding model 220 may pick up biases and stereotypes present in data (e.g., data collected from the Internet) that are used to train the MM embedding model 220.

At (3), the embedding setup service 114 may store media embeddings returned by the MM embedding model 220 to the embedding data store 112. As noted above, the embedding data store 112 may further store a media embedding model (not shown in FIG. 2) that can be utilized by the search system 106 to execute similarity searches for identifying media embeddings that are similar to transformed query embeddings.

Figure 3:
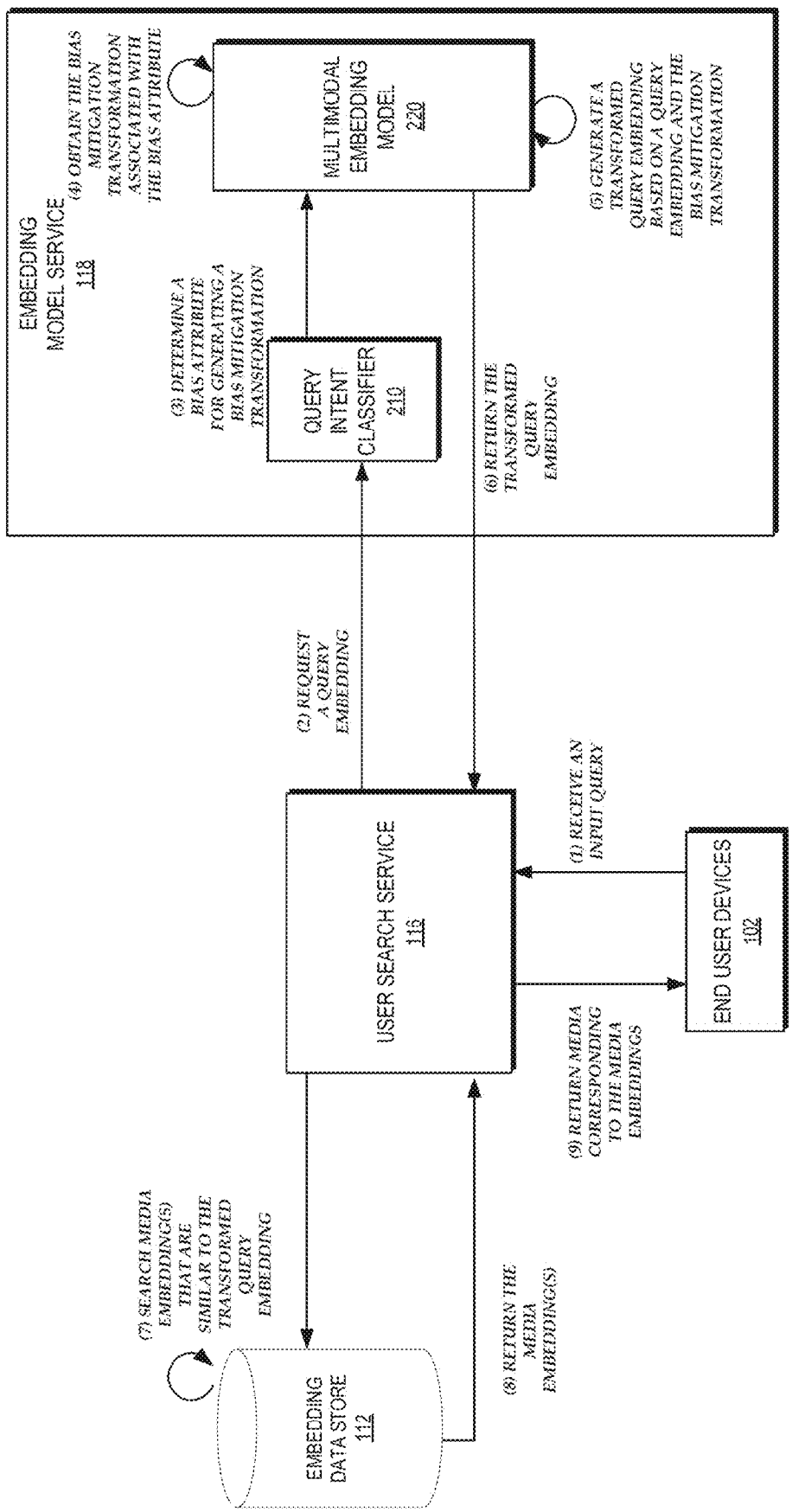
FIG. 3 depicts example interactions between elements of the search system of FIG. 1 to search media in response to an input query, according to some embodiments of the present disclosure.

FIG. 3 depicts example interactions between elements (e.g., the user search service 116, the embedding model service 118, and the embedding data store 112) of the search system 106 of FIG. 1 to mitigate bias in the MM embedding model 220 during searching media based on input queries, according to some embodiments of the present disclosure.

The interactions of FIG. 3 begin at (1), where the user search service 116 receives an input query from the end user devices 102. The input query may express intent to search one or more media (e.g., images, audio, video, or the like). For example, the input query may include natural language text that provides "a photo of a female doctor."

At (2), the user search service 116 may request a query embedding from the embedding model service 118. As indicated in FIG. 3, the input query may be received by the query intent classifier 210. The query intent classifier 210 can be implemented as a classification model that can infer intent of the input query, where the classification model may be any machine learning (ML) or neural network (NN) models trained to infer or classify intent of input queries received from the end user devices 102. For example, the query intent classifier 210 may receive the input query that provides "a photo of a female doctor."

At (3), the query intent classifier 210 determines an attribute for generating a bias mitigation transformation based on the input query. For example, based on the input query that provides "a photo of a female doctor." the query intent classifier 210 may employ one or more ML models to determine to mitigate bias against race when searching photos of female doctors such that photos identified may include female doctors from diverse races rather than predominated by particular race(s).

Optionally, the query intent classifier 210 may further determine that the input query "a photo of a female doctor" intends to perform an image search that includes a criterion on gender (e.g., the gender being female) because the input query expressly specifies "female doctor" rather than just "doctor". Based on the determination that the input query intends to perform an image search that includes the criterion on gender, the query intent classifier 210 may instruct the MM embedding model 220 to generate a bias mitigation transformation based on race rather than based on gender. As such, a transformed query embedding generated by the bias mitigation transformation may mitigate bias against race rather than bias against gender when used for searching image embeddings.

Alternatively and/or optionally, the input query may expressly specify sensitive attributes that should be suppressed during media searching and sensitive attributes that should not be suppressed during media searching. For example, the input query may explicitly provide to the embedding model service 118 that bias mitigation on race should be enabled while bias mitigation on gender should not. As such, the query intent classifier 210 may not need to employ any ML model(s) for determining what sensitive attributes to mitigate against or not.

At (4), the MM embedding model 220 may obtain the bias mitigation transformation associated with the sensitive attribute determined by the query intent classifier 210. For example, if the sensitive attribute being race, the MM embedding model 220 may generate the bias mitigation transformation based on the equation (2) above. Specifically, the bias mitigation transformation may be represented as $P_r^T P_r$, where P is a projection matrix that was fit to a dataset, $P_r$ is a modified version of the projection matrix P based on race, and $P_r^T$ is a transposition of $P_r$. In other examples, the bias mitigation transformation may be associated with two or more sensitive attributes. For example, the bias mitigation transformation may be associated with both age and race, and may be represented as $P_{ra}^T P_{ra}$, where $P_{ra}$ is a modified version of the projection matrix P based on both race and age. It should be noted that the bias mitigation transformation may be generated in advance and stored in a data store (not shown in FIG. 3) of the search system 106 by the MM embedding model 220, and the MM embedding model 220 may retrieve the bias mitigation transformation from the data store to obtain the bias mitigation transformation. Alternatively, the MM embedding model 220 may generate the bias mitigation transformation after the query intent classifier 210 determines the sensitive attribute.

Thereafter, at (5), the MM embedding model 220 may generate a transformed query embedding based on a query embedding of the input query and the bias mitigation transformation. For example, if the query intent classifier 210 determines that the attribute for generating the bias mitigation transformation is race, the transformed query embedding generated by the MM embedding model 220 may be represented as $P_r^T P_r E(Q)$, where E(Q) represents an embedding of the input query (e.g., "a female doctor"), $P_r$ is a modified version of the projection matrix P based on race, and $P_r^T$ is a transposition of $P_r$.

At (6), the MM embedding model 220 may return the transformed query embedding to the user search service 116. For example, based on the input query "a photo of a female doctor," the transformed query embedding returned to the user search service 116 may be represented as $P_r^T P_r E(Q)$. More specifically, the transformed query embedding $P_r^T P_r E(Q)$, when used for executing a similarity search against image embeddings, may suppress at least a portion of the query embedding E(Q) related to race without suppressing any portion of the query embedding E(Q) related to gender, where the query embedding E(Q) may be generated by the MM embedding model 220 based on the input query "a photo of a female doctor."

At (7), using the transformed query embedding provided by the user search service 116, the embedding data store 112 may coordinate with the user search service 116 to search media embeddings that are similar to the transformed query embedding. In some embodiments, the embedding data store 112 and/or the user search service 116 may execute a similarity search to identify one or more image embeddings that are similar to the transform query embedding based on the equation (2). For example, using the transformed query embedding $P_r^T P_r E(Q)$, the user search service 116 may execute the similarity search by obtaining a similarity score $SS_i$ through calculating an inner product between $P_r^T P_r E(Q)$ and each of $E(I_i)$, where i being from 1 to n and n representing a number of image embeddings. Based on the similarity score $SS_i$ obtained between the transformed query embedding and each image embedding, the embedding data store 112 may identify top-k image embeddings $E(I_i)$ that are most similar to the transformed query embedding, where k may be 10, 20, 30, 40, 50, 100, or any other positive integers.

As noted above, for executing a similarity search, matrix multiplication can be performed solely on the query embedding E(Q) and none of the image media embeddings needs to be multiplied with a projection matrix or a bias mitigation transformation. As such, the search system 106 can more efficiently handle searching on large datasets and become more scalable.

Additionally, the embedding data store 112 and/or the 116 does not need to compute and store various versions of inner products between projection matrixes and image embeddings because matrix multiplications on media embeddings are unnecessary. To mitigate bias against various demographic attributes or various combinations of demographic attributes, the embedding model service 118 may simply modify a projection matrix that was fit to a dataset based on attribute(s) that are selected for bias mitigation to generate the bias mitigation transformation. Advantageously, the adaptability and the scalability of the search system 106 may be improved. The search system 106 may also require less data storage capacity.

Further, the embedding model service 118 can decide whether to mitigate which sensitive attributes and perform associated computations (e.g., matrix multiplications on query embeddings) until "inference time" (e.g., when an input query is received, and an intent expressed in the input query can be determined) because of reduced computational complexity associated with performing matrix multiplications on query embeddings. As such, decisions on whether to mitigate biases and/or performing matrix multiplications on query embeddings can be made on the fly (e.g., in response to receiving an input query) by the embedding model service 118 and less computational resources may be wasted by the user search service 116 and/or the embedding data store 112 on multiplying projection matrixes and media embeddings.

Alternatively, the embedding data store 112 and/or user search service 116 may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms to search media embedding(s) that are similar to the transformed query embedding.

At (8), the embedding data store 112 may return media embeddings identified in the similarity search performed at (7) to the user search service 116. For example, the embedding data store 112 may return top-k image embeddings $E(I_i)$ that are most similar to the transformed query embedding that is generated at (6) based on the input query "a photo of a female doctor."

At (9), the user search service 116 may obtain and return media corresponding to media embeddings returned by the embedding data store 112 based on results of the similarity search. For example, in response to receiving the input query "a photo of a female doctor," the user search service 116 may return images of female doctors to the end user devices 102. By executing the similarity search using the transformed query embedding $P_r^T P_r E(Q)$ that suppress at least a portion of the query embedding E(Q) related to race without suppressing any portion of the query embedding E(Q) related to gender, the returned images may include female doctors (rather than male doctors) that may have diversity in race.

Example Routines for Mitigating Bias in Executing Similarity Searches

Figure 6:
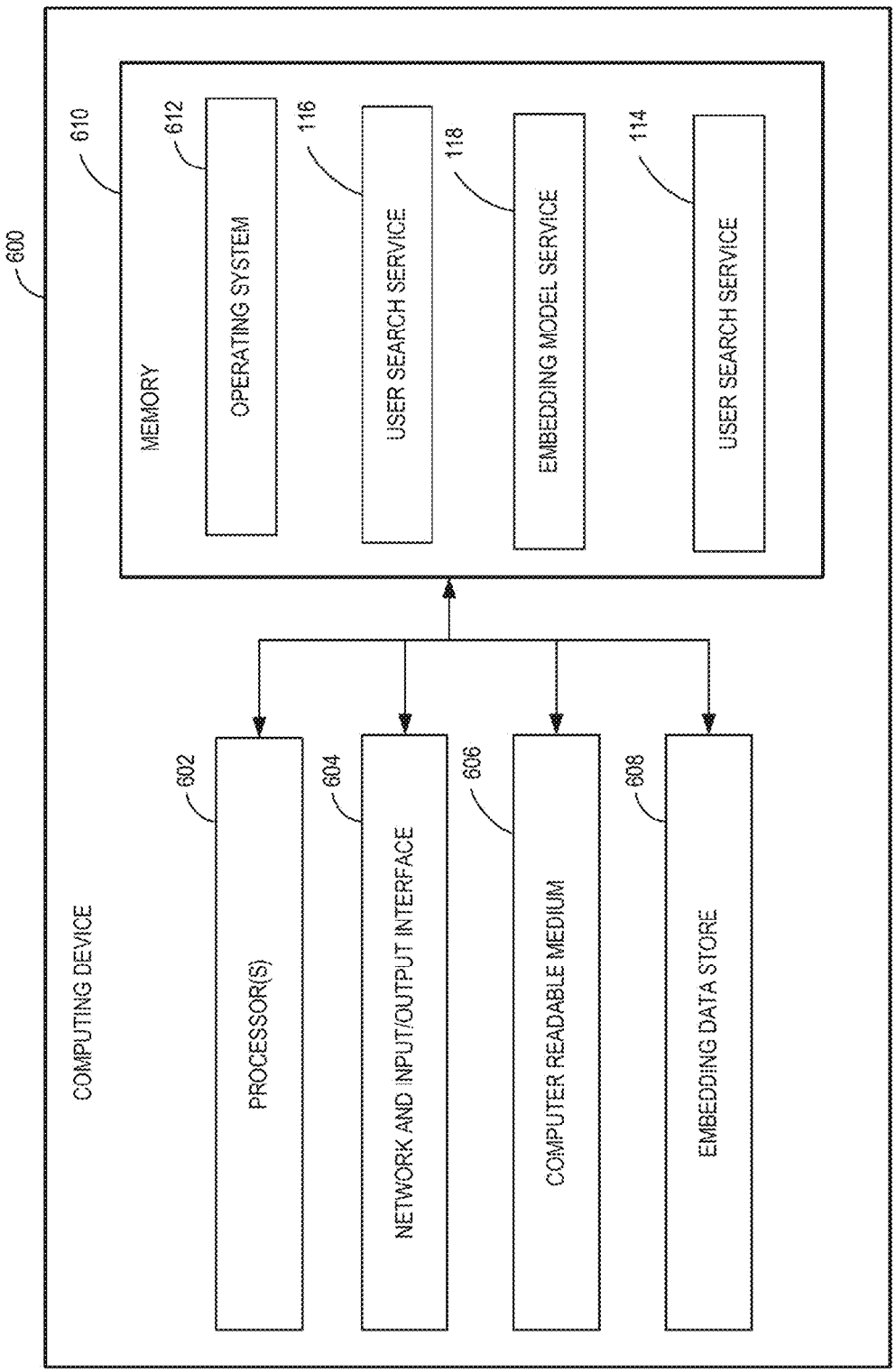
FIG. 6 depicts a general architecture of a search system that is capable of mitigating bias in MM embedding models for searching media in accordance with some embodiments of the present disclosure.

When a routine described herein (i.e., routine 400A, 400B, and 500) is initiated, a set of executable program instructions stored on one or more non-transitory computer-readable media (e.g., hard drive, flash memory, removable media, etc.) may be loaded into memory (e.g., random access memory or RAM) of a computing device, such as the computing device 600 shown in FIG. 6, and executed by one or more processors. In some embodiments, the routine 400A, 400B, and 500, or portions thereof may be implemented on multiple processors, serially or in parallel. In some embodiments, the routine 400A, 400B, and 500, or portions thereof may be implemented on the search system 106 of FIG. 1.

Figure 4A:
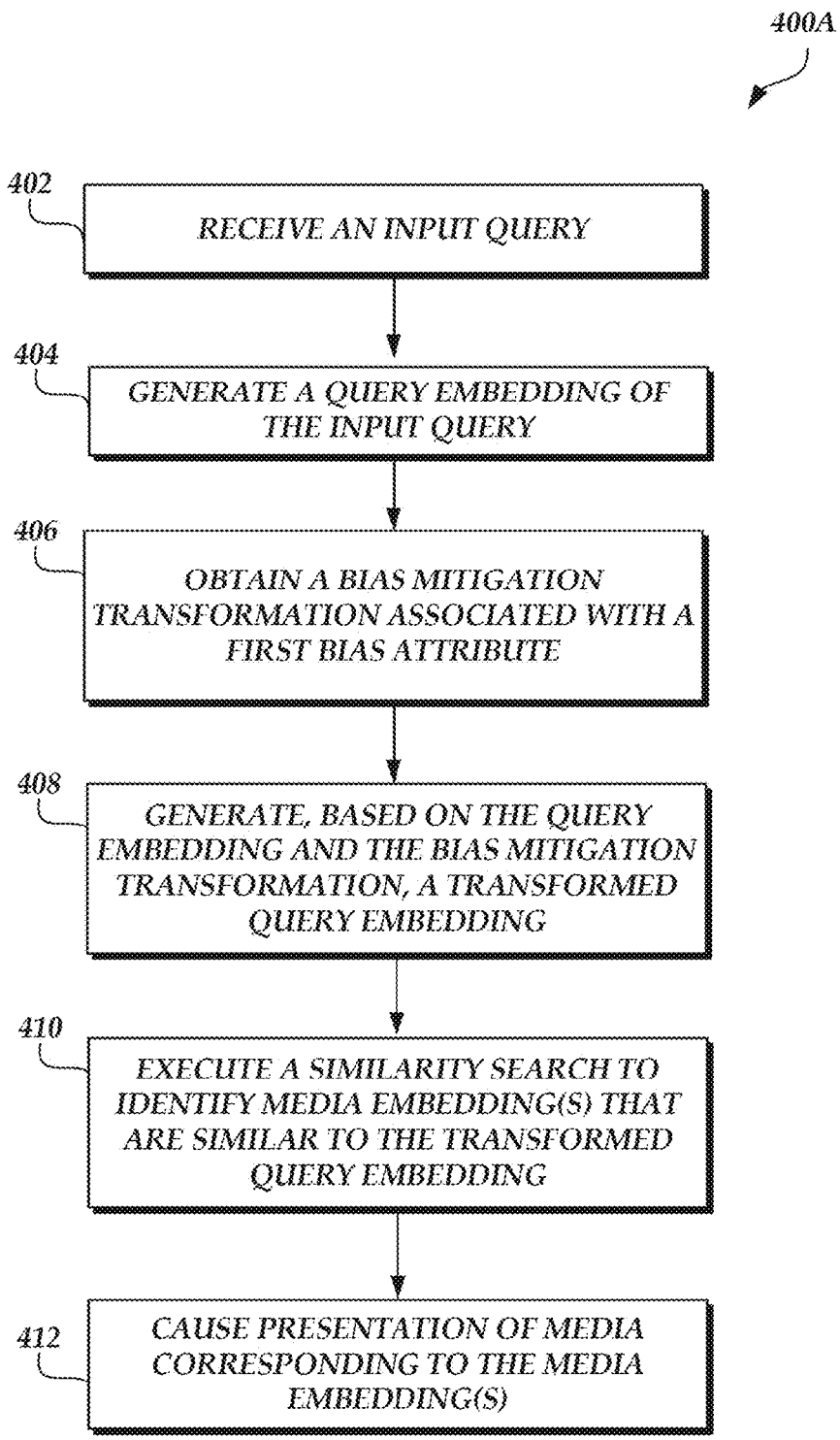
FIG. 4A is a flow diagram of an illustrative routine for mitigating bias in embeddings generated by MM embedding models when searching media, according to some embodiments of the present disclosure.

With reference to FIG. 4A, an illustrative routine 400A for mitigating bias in multimodal (MM) models via query transformation when executing media searches will be described. The routine 400A may be implemented, for example, by the search system 106 (e.g., the user search service 116, embedding model service 118, and embedding data store 112) of FIG. 1. The routine 400A may allow the search system 106 to cause presentation of media in response to user queries.

The routine 400A begins at block 402, where the search system 106 receives an input query. For example, the user search service 116 may receive the input query that expresses an intent to search one or more media (e.g., images, audio, video, or the like). For example, the input query may include natural language text that provides "a woman with red hair."

At block 404, the search system 106 generates a query embedding of the input query received at block 402. For example, the embedding model service 118 (e.g., the MM embedding model 220) may generate a query embedding of the input query "a woman with red hair." Because the MM embedding model 220 may pick up biases and stereotypes present in data (e.g., data collected from the Internet) that are used to train the MM embedding model 220, the query embedding generated at block 404 may be biased against one or more sensitive attributes.

At block 406, the search system 106 obtains a bias mitigation transformation associated with a first sensitive attribute. For example, the embedding model service 118 (e.g., the MM embedding model 220) may generate the bias mitigation transformation associated with the first sensitive attribute. More specifically, based on the input query "a woman with red hair," the embedding model service 118 may generate the bias mitigation transformation associated with race rather than with gender.

At block 408, the search system 106 generates a transformed query embedding based on the query embedding generated at block 404 and the bias mitigation transformation generated at block 406. For example, the embedding model service 118 (e.g., the MM embedding model 220) may generate the transformed query embedding by multiplying $P_r^T$ by $P_r$ and $E(Q)$, where $E(Q)$ represents an embedding of the input query (e.g., "a woman with red hair"), $P_r$ is a modified version of a projection matrix P based on race, and $P_r^T$ is a transposition of $P_r$.

At block 410, the search system 106 executes a similarity search to identify media embedding(s) that are similar to the transformed query embedding generated at block 408. For example, the embedding data store 112 and or the user search service 116 may execute the similarity search to identify media embedding(s) that are similar to the transformed query embedding. More specifically, using the transformed query embedding $P_r^T P_r E(Q)$ that is generated based on the input query "a photo of a woman with red hair," the user search service 116 may execute the similarity search by obtaining a similarity score $SS_i$ through calculating an inner product between $P_r^T P_r E(Q)$ and each of $E(I_i)$, where i being from 1 to n and n representing a number of image embeddings. Based on the similarity score $SS_i$ obtained between the transformed query embedding and each image embedding, the embedding data store 112 may identify top-k image embeddings $E(I_i)$ that are most similar to the transformed query embedding, where k may be 10, 20, 30, 40, 50, 100, or any other positive integers. By executing the similarity search using the transformed query embedding, at least a portion of the query embedding of the input query "a woman with red hair" related to race may be suppressed but any portion of the query embedding related to gender may not be suppressed.

At block 412, the search system 106 causes presentation of media corresponding to the media embedding(s) identified at block 410. For example, the user search service 116 may cause presentation of images corresponding to image embeddings that are most similar to the transformed query embedding that is generated based on the input query "a photo of a woman with red hair."

Figure 4B:
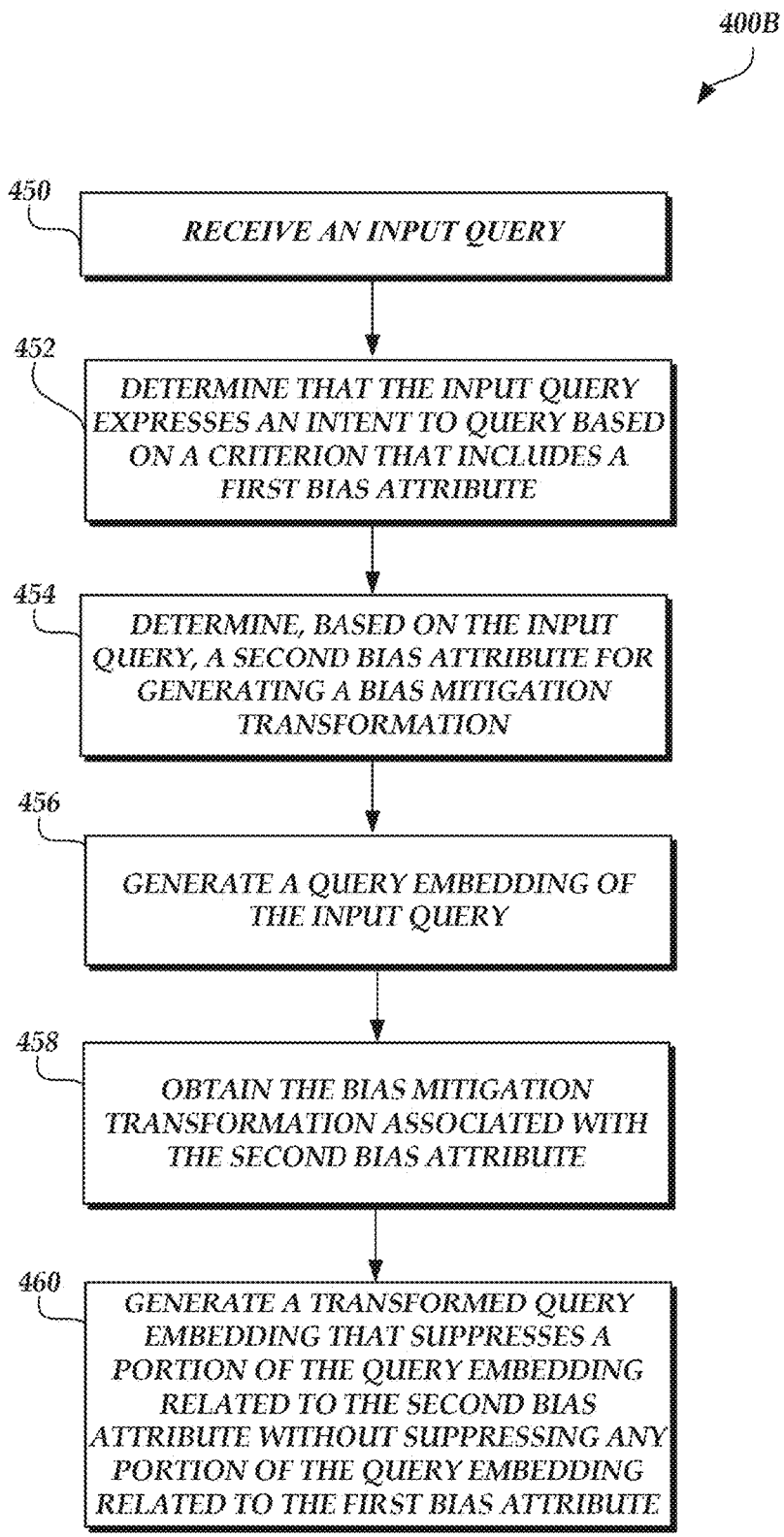
FIG. 4B is a flow diagram of an illustrative routine for generating a transformed query embedding to mitigate bias against one sensitive attribute without mitigating bias against another sensitive attribute, according to some embodiments of the present disclosure.

With reference to FIG. 4B, an illustrative routine 400B for generating a transformed query embedding to mitigate bias against one sensitive attribute without mitigating bias against another sensitive attribute will be described. The routine 400B may be implemented, for example, by the search system 106 (e.g., the embedding model service 118) of FIG. 1.

The routine 400B begins at block 450, where the search system 106 receives an input query. For example, the user search service 116 may receive the input query that expresses an intent to search one or more media (e.g., images, audio, video, or the like). For example, the input query may include natural language text that provides a photo of "a male teacher."

At block 452, the search system 106 determines that the input query expresses an intent to query based on a criterion that includes a first sensitive attribute. For example, the query intent classifier 210 may determine that the input query expresses the intent to query based on the criterion that includes the first sensitive attribute. Given the input query a photo of "a male teacher." the query intent classifier 210 may determine that the input query expresses the intent to query based on the criterion that includes male.

At block 454, the search system 106 determines a second sensitive attribute for generating a bias mitigation transformation based on the input query. For example, the query intent classifier 210 may determine the second sensitive attribute for generating the bias mitigation transformation based on the input query, where the second sensitive attribute is different from the first sensitive attribute determined at block 452. Given the input query a photo of "a male teacher." the query intent classifier 210 may determine race for generating the bias mitigation transformation. Alternatively, the query intent classifier 210 may determine that race and skin tone should be used for generating the bias mitigation transformation.

At block 456, the search system 106 generates a query embedding of the input query. For example, the MM embedding model 220 may generate the query embedding of the input query "a male teacher." The query embedding can be a low dimensional vector representation of the natural language text "a male teacher."

At block 458, the search system 106 obtains the bias mitigation transformation associated with the second sensitive attribute that is determined at block 454. For example, the MM embedding model 220 may obtain the bias mitigation transformation associated with race. As such, a transformed query embedding generated by applying the bias mitigation transformation to the query embedding may suppress at least a portion of the query embedding related to race when searching images of "a male teacher." It should be noted that the bias mitigation transformation may be generated in advance and stored in a data store of the search system 106 by the MM embedding model 220, and the MM embedding model 220 may retrieve the bias mitigation transformation from the data store to obtain the bias mitigation transformation. Alternatively, the MM embedding model 220 may generate the bias mitigation transformation after the second sensitive attribute is determined at block 454.

At block 460, the search system 106 generates a transformed query embedding that suppresses a portion of the query embedding related to the second sensitive attribute without suppressing any portion of the query embedding related to the first sensitive attribute. For example, based on the query embedding of the input query "a male teacher" generated at block 456 and the bias mitigation transformation generated at block 458, the embedding model service 118 (e.g., the MM embedding model 220) may generate the transformed query embedding that suppresses a portion of the query embedding related to race without suppressing any portion of the query embedding related to gender when searching for images of "a male teacher." As noted above, using the transformed query embedding generated at block 460 for executing a similarity search on images of "a male teacher" does not require matrix multiplications on image embeddings. Instead, a matrix multiplication can be performed solely on the query embedding of the input query "a male teacher" such that the search system 106 can search for images more computationally efficient.

Figure 5:
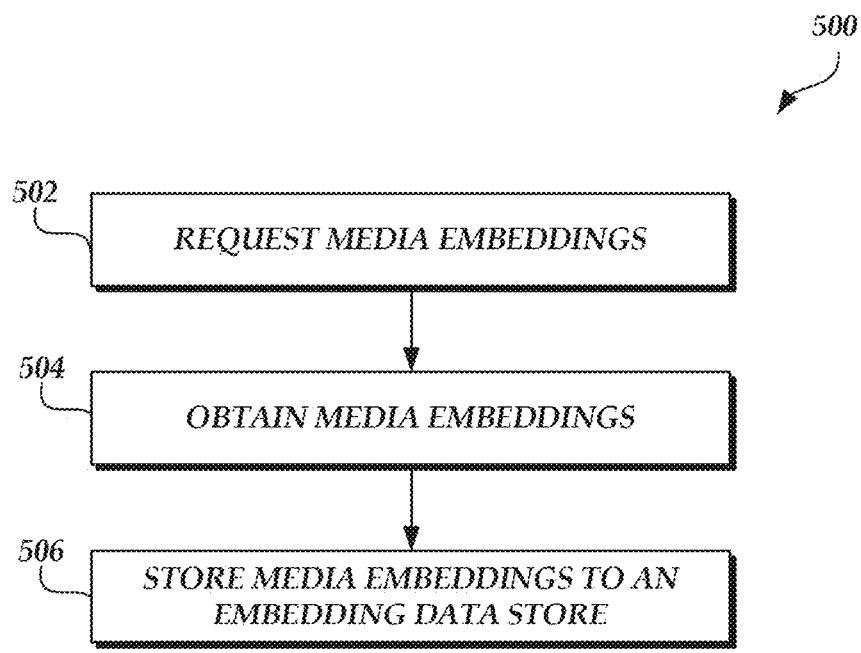
FIG. 5 is a flow diagram of an illustrative routine for generating a media embedding model, according to some embodiments of the present disclosure.

With reference to FIG. 5, an illustrative routine 500 for generating a media embedding model for storing media embeddings that will be utilized for searching media based on user queries will be described. The routine 500 may be implemented, for example, by the search system 106 (e.g., the embedding setup service 114, the embedding model service 118, and the embedding data store 112) of FIG. 1.

The routine 500 begins at block 502, where the search system 106 requests media embeddings. For example, the embedding setup service 114 may request media embeddings from the MM embedding model 220 of the embedding model service 118. The media embeddings may be low dimensional vector representation of any types of media, such as text, image, video, audio, or the like.

At block 504, the search system 106 obtains media embeddings. More specifically, the embedding setup service 114 may obtain media embeddings from the MM embedding model 220 of the embedding model service 118.

At block 506, the search system 106 stores media embeddings to an embedding data store. For example, the embedding setup service 114 may store media embeddings to the embedding data store 112. As noted above, the media embeddings stored to the embedding data store 112 may inherit at least some biases from training data sets utilized to train the MM embedding model 220. Instead of applying various versions of projection matrixes to media embeddings stored in the embedding data store 112 when executing similarity searches to search media based on user queries, the search system 106 generates transformed query embedding based on query embeddings and bias mitigation transformations such that no projections matrixes have to be applied to media embeddings stored in the embedding data store 112. As such, the embedding data store 112 may utilize storage resources more efficiently.

Execution Environment

FIG. 6 depicts an example architecture of a computing device (e.g., the search system 106) that can be used to perform one or more of the techniques described herein or illustrated in FIGS. 1-5. The general architecture of the search system 106 depicted in FIG. 6 includes an arrangement of computer hardware and software modules that may be used to implement one or more aspects of the present disclosure. The search system 106 may include many more (or fewer) elements than those shown in FIG. 6. It is not necessary, however, that all of these elements be shown in order to provide an enabling disclosure.

In some embodiments, the computing device 600 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the computing device 600 may be implemented as web services consumable via one or more communication networks. In further embodiments, the computing device 600 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a computing device 600 may include: one or more computer processors 602, such as physical central processing units ("CPUs"); one or more network and input/output interfaces 604, such as a network interface cards ("NICs"); one or more computer-readable medium 606, such as a high density disk ("HDDs"), solid state drives ("SSDs"), flash drives, and/or other persistent non-transitory computer readable media; and one or more embedding data stores 608; a memory 610 that includes operating system 612, user search service 116, embedding setup service 114, and embedding model service 118.

The processor 602 may communicate with memory 610. The memory 610 may contain computer program instructions (grouped as modules or units in some embodiments) that the processor 602 executes in order to implement one or more aspects of the present disclosure. The memory 610 may include random access memory (RAM), read only memory (ROM), and/or other persistent, auxiliary, or non-transitory computer-readable media. Additionally, the memory 610 can be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). The memory 610 may store an operating system (not shown in FIG. 6) that provides computer program instructions for use by the processor 602 in the general administration and operation of the search system 106.

Additionally, the memory 610 may further include computer program instructions and other information for implementing one or more aspects of the present disclosure, including but not limited to the embedding data store 112, the user search service 116, and the embedding model service 118. The processor 602 may execute the instructions or program code stored in the memory 610 to generate bias mitigation transformation and/or transformed query embeddings as described herein based on input queries. In some embodiments, parts or all of the embedding setup service 114, user search service 116, and embedding model service 118 may be implemented by hardware circuitry, firmware, software or a combination thereof.

The network and input/output interface 604 may commonly support one or more wireless networking protocols (e.g., Wi-Fi/IEEE 802.11, or another wireless networking standard). However, in various embodiments, network and input/output interface 604 may support communication via any suitable wired or wireless general data networks, such as other types of Ethernet networks, for example. Additionally, network and input/output interface 604 may support communication via telecommunications/telephony networks such as analog voice networks or digital fiber communications networks, via storage area networks such as Fibre Channel SANs, or via any other suitable type of network and/or protocol.

The computer-readable medium 606 may include computer program instructions that one or more processors 602 execute and/or data that the one or more processors 602 use in order to implement one or more embodiments.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a hardware processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software, which can be collectively referred to as computer-implemented methods. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    computer-readable memory storing a multimodal (MM) embedding model; and
    one or more processors configured by executable instructions to:
        receive an input query;
        determine that the input query expresses an intent to perform an image search and that at least one criterion of the image search comprises a first sensitive attribute;
        generate a query embedding of the input query using the multimodal (MM) embedding model;
        obtain a bias mitigation transformation associated with a second sensitive attribute different from the first sensitive attribute;
        generate, based on the query embedding and the bias mitigation transformation, a transformed query embedding that suppresses at least a portion of the query embedding related to the second sensitive attribute without suppressing any portion of the query embedding related to the first sensitive attribute;
        execute, using the transformed query embedding, a similarity search in a media embedding model to identify one or more image embeddings that are similar to the transformed query embedding, wherein the one or more image embeddings are generated by the multimodal (MM) embedding model; and
        transmit the one or more image embeddings.

2. The system of claim 1 wherein the bias mitigation transformation comprises a projection matrix, and wherein generating the transformed query embedding comprises:
    multiplying a transposition of the projection matrix by the projection matrix and the query embedding.

3. The system of claim 1 wherein the second sensitive attribute is a demographic attribute that is one of: gender, age, race, or skin tone.

4. The system of claim 3 wherein the one or more processors are further configured by executable instructions to:
    generate the media embedding model, wherein generating the media embedding model comprises:
        obtaining embeddings from the multimodal (MM) embedding model; and
        storing the embeddings that comprise the one or more image embeddings into an embedding data store.

5. A computer-implemented method comprising:
    as implemented by a hardware processor configured to execute computer-executable instructions:
        receiving an input query;
        generating a query embedding of the input query;
        determining, based on the input query, a first sensitive attribute;
        obtaining a bias mitigation transformation associated with the first sensitive attribute;
        generating, based on the query embedding and the bias mitigation transformation, a transformed query embedding that suppresses at least a portion of the query embedding related to the first sensitive attribute;
        executing, using the transformed query embedding, a similarity search in a media embedding model to identify one or more media embeddings that are similar to the transformed query embedding; and
        transmitting the one or more media embeddings.

6. The computer-implemented method of claim 5 wherein the bias mitigation transformation comprises a projection matrix, and wherein generating the transformed query embedding comprises:
    multiplying a transposition of the projection matrix by the projection matrix and the query embedding.

7. The computer-implemented method of claim 5 wherein the query embedding is generated by a multimodal (MM) embedding model.

8. The computer-implemented method of claim 7 wherein the one or more media embeddings are generated by the multimodal (MM) embedding model.

9. The computer-implemented method of claim 5 further comprising:
    determining that the input query expresses an intent to perform a media search, wherein at least one criterion of the media search comprises a second sensitive attribute.

10. The computer-implemented method of claim 9 wherein the transformed query embedding suppresses at least the portion of the query embedding related to the first sensitive attribute without suppressing any portion of the query embedding related to the second sensitive attribute.

11. The computer-implemented method of claim 5 wherein the bias mitigation transformation is further associated with a second sensitive attribute, and wherein the transformed query embedding suppresses at least the portion of the query embedding related to the first sensitive attribute and at least a portion of the query embedding related to the second sensitive attribute.

12. The computer-implemented method of claim 5 wherein obtaining the bias mitigation transformation associated with the first sensitive attribute comprises:
- generating the bias mitigation transformation associated with the first sensitive attribute; or
- retrieving the bias mitigation transformation associated with the first sensitive attribute from a data store.

13. The computer-implemented method of claim 12 wherein determining the first sensitive attribute uses at least one of: an intent expressed in the input query, or a classification model.

14. The computer-implemented method of claim 12 wherein generating the bias mitigation transformation comprises:
- modifying, based on the first sensitive attribute, a projection matrix to generate the bias mitigation transformation.

15. The computer-implemented method of claim 14 further comprising generating the projection matrix, wherein generating the projection matrix comprises:
- fitting the projection matrix to a data set.

16. The computer-implemented method of claim 5 wherein the one or more media embeddings comprises at least one of: text embeddings, image embeddings, video embeddings, audio embeddings, or any combination of multimedia embeddings.

17. The computer-implemented method of claim 5 wherein the first sensitive attribute is a demographic attribute that is one of: gender, age, race, or skin tone.

18. One or more non-transitory computer-readable media comprising computer-executable instructions, wherein the computer-executable instructions, when executed by a computer system, cause the computer system to perform operations comprising:
- receiving an input query;
- generating a query embedding of the input query;
- determining, based on the input query, a first sensitive attribute;
- obtaining a bias mitigation transformation associated with the first sensitive attribute;
- generating, based on the query embedding and the bias mitigation transformation, a transformed query embedding that suppresses at least a portion of the query embedding related to the first sensitive attribute;
- executing, using the transformed query embedding, a similarity search in a media embedding model to identify one or more media embeddings that are similar to the transformed query embedding; and
- transmitting the one or more media embeddings.

19. The one or more non-transitory computer-readable media of claim 18, wherein the bias mitigation transformation comprises a projection matrix, and wherein generating the transformed query embedding comprises:
- multiplying a transposition of the projection matrix by the projection matrix and the query embedding.

20. The one or more non-transitory computer-readable media of claim 18, wherein the query embedding is generated by a multimodal (MM) embedding model.

\* \* \* \* \*